(12) United States Patent
Su Hsiao

(10) Patent No.: US 7,632,443 B2
(45) Date of Patent: Dec. 15, 2009

(54) METHOD FOR MANUFACTURING A COMPOSITE MATERIAL

(76) Inventor: Min-Hsiu Su Hsiao, 18-3F., 20-3, Lane 128, Sec. 3, Taichung Port Rd., Taichung (TW)

( * ) Notice: Subject to any disclaimer, the term of this patent is extended or adjusted under 35 U.S.C. 154(b) by 139 days.

(21) Appl. No.: 11/863,051

(22) Filed: Sep. 27, 2007

(65) Prior Publication Data

US 2009/0085239 A1 Apr. 2, 2009

(51) Int. Cl.
*B32B 25/12* (2006.01)
*B29C 47/02* (2006.01)
*B29C 47/06* (2006.01)

(52) U.S. Cl. .................. 264/171.24; 264/215; 264/216; 264/46.6

(58) Field of Classification Search ........................ None
See application file for complete search history.

(56) References Cited

U.S. PATENT DOCUMENTS 3,402,085 A * 9/1968 Trimble ...................... 156/189
5,865,696 A * 2/1999 Calapp et al. ............... 473/561

* cited by examiner

*Primary Examiner*—Monica A Huson
(74) *Attorney, Agent, or Firm*—Chun-Ming Shih

(57) ABSTRACT

A method for manufacturing a composite material is disclosed, and the method includes providing a sheet object, submerging the sheet object in a thermosetting resin to form a compound, rolling up the compound to a hollow formation, stuffing a substance into the hollow compound, and heating up and solidifying.

18 Claims, 4 Drawing Sheets

METHOD FOR MANUFACTURING A COMPOSITE MATERIAL

BACKGROUND

1. Field of Invention

The present invention relates to a composite material, and more particularly to a method for manufacturing a composite material.

2. Description of Related Art

To protect the natural environment globally, developing materials to save power, reduce waste and prevent environmental damage has become very important and has greatly influenced the research direction of polymer production and materials.

Take the architecture industry for example, the building material, decoration material, furniture material are mostly wood. As awareness of environmental protection grows, manufacturers aim at developing wood substitutes to protect forests and jungles and thereby protect the earth's ecology.

Wood-plastic composites (WPC) that have wood-like appearance, greater hardness than plastic material and recycle benefits have been developed and are widely used in the construction and interior decorating industry. However, WPC quality depends on manufacturing processes, and inappropriate proportion distribution of the ingredients affects the mechanical performance of the product. In addition, there are other substitutes constructed by foam and multiple flexible bars (ex. plastic bars) wherein the flexible bars are extruded into the foam. This kind of substitute has better hardness than the foam itself because of the flexible bar design, but nails are difficult to fasten on the substitute because of the foam elasticity such that the substitute is too loose to attach on a surface (wall surface etc.).

As a result, developing another composite material that can be applied in many fields (such as building material, decoration material, furniture material etc.), that can replace wood, conform to environmental protection demands, reduce cost and improve hardness and stiffness is the aim of the present invention.

SUMMARY

It is therefore an aspect to provide a method for manufacturing a composite material whereby the composite material thereof enhances the hardness and the stiffness of the material.

It is therefore another aspect to provide a method for manufacturing a composite material whereby the composite material thereof can be applied to various fields, such as building material, decoration material and furniture material to decrease weight, conform to environmental protection standards and reduce the material cost.

In accordance with an embodiment of the present invention, the method for manufacturing a composite material includes providing a sheet object, submerging the sheet object in a thermosetting resin to form a compound, rolling up the compound to a hollow formation, stuffing a substance into the hollow compound, and heating up and solidifying to form a composite.

As a result, applying the composite material to a die with determined formation (such as building material, decoration material, furniture material etc.) can decrease weight and reduce material cost. In addition, taking the sheet material as a core for the composite material raises the strength and stiffness of the entire composite material.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
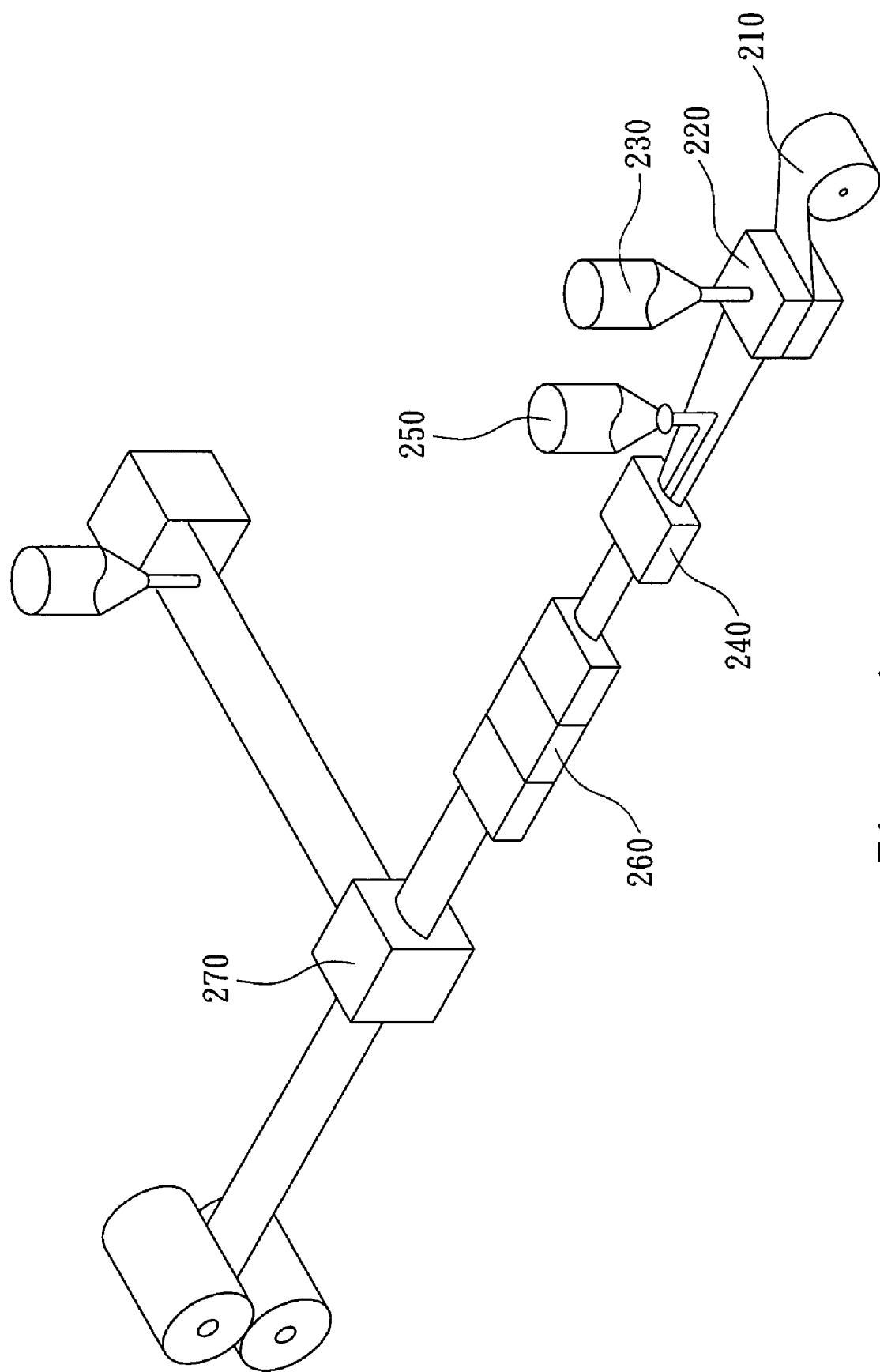
FIG. 1 is a schematic manufacturing process of an embodiment in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 2:
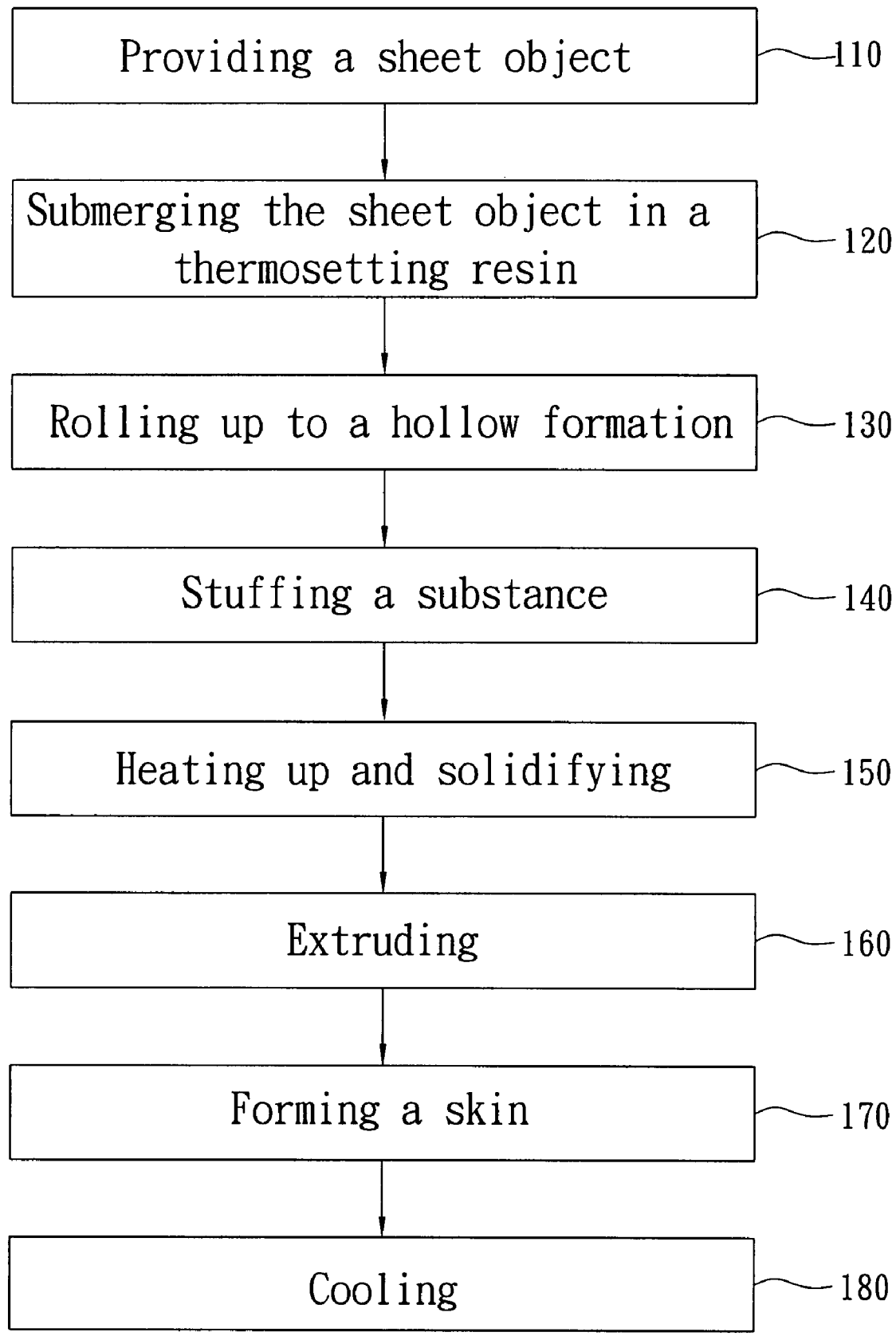
FIG. 2 is a flow chart of the embodiment in accordance with the present invention.
Figure 3:
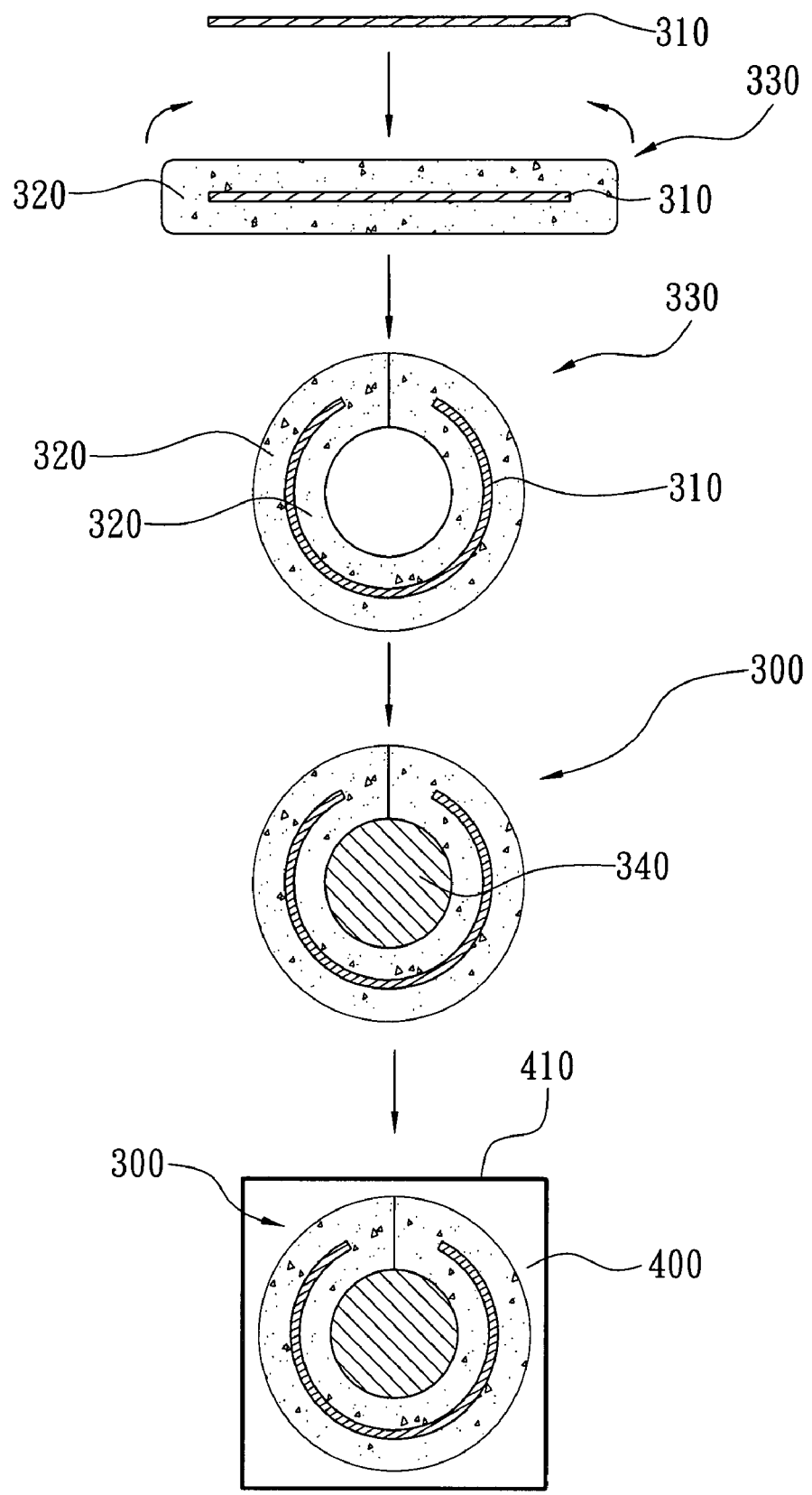
FIG. 3 is a structure sectional view of the embodiment for the method in accordance with the present invention.

Refer to FIG. 1, FIG. 2 and FIG. 3. FIG. 1 illustrates a schematic manufacturing process of an embodiment in accordance with the present invention; FIG. 2 illustrates a flow chart of the embodiment in accordance with the present invention; FIG. 3 illustrates a structure sectional view of the embodiment for the method in accordance with the present invention.

The method for manufacturing a composite material includes providing a sheet object, submerging the sheet object in a thermosetting resin, rolling the sheet up into a hollow formation, stuffing a substance in the hollow formation to shape a formation, curing the thermosetting resin by heating up and solidifying to form the composite material, extruding the composite material into a die, and cooling the composite material.

In step 110, providing a sheet object 310 wherein the sheet object 310 may be but not limited to cardboard, non-woven fabric, polyester fiber, polyamide fiber, fiber glass, carbon fiber, plastic film or fabric made of any of the above fibers or the combination thereof.

In step 120, transferring the sheet object 310 to a tank 220 through feeding wheels 210 wherein the tank 220 includes a sprue 230 whereby the thermosetting resin 320 fills up the tank 220. The sheet object 310 is submerged in and coated with the thermosetting resin 320 to form a compound 330. In this embodiment, the thermosetting resin 320 may be but not limited to unsaturated polyester, phenol resin, epoxy resin, silicon resin or urethane resin.

In addition, the thickness of the sheet object 310 is altered in accordance with the size of compound 330, and the smaller sheet object brings the stronger hardness. In general, the sheet object has the same weight proportion as the weight proportion of the thermosetting resin. In this embodiment, the distribution in proportion between the sheet object 310 and the thermosetting resin 320 is approximately 1:9. The practical distribution in proportion should be designed in accordance with various conditions (size, material, weight proportion, hardness etc.) of the product, and the above distribution in this embodiment is disclosed for illustration only.

In step 130, rolling up the compound 330 to a hollow formation by a mold 240 with gradually decreased angles.

In step 140, stuffing a substance 340 into the hollow compound 330 by a filler 250 wherein the substance 340 is an expanding foam or a non-expanding foam. Therefore, the compound 330 is stuffed with the substance 340 for expansion to shape and form a composite material 300.

In step 150, curing the thermosetting resin 320 by heating up and solidifying the thermosetting resin 320 of the compound 330 through a heating area 260 after the composite material 300 is shaped. The heating temperature in the heating area 260 is approximately between 60° C. and 150° C., but the practical heating temperature depends on various conditions, such as the heat endurance of the core object, process design, hardening agent and so on. In other words, the heating temperature is predetermined at a lower temperature when the heat endurance of the sheet object 310 is inferior wherein the predetermined temperature is between the heating temperature enabling the thermosetting resin 320 to generate chemical reaction and the limit temperature which is endurable for the sheet object 310. Regarding process design, raising the heating temperature shortens the hardening period of the thermosetting resin 320, and lowering the heating temperature extends the hardening period of the thermosetting resin 320. Through this step, the thermosetting resin 320 is gradually solidified to shape a formation by heating. In this embodiment, the thermosetting resin is disclosed for illustration only, and other resins having irreversible rigid and melting properties on being heated constantly can also replace the material strengthening the sheet object 310.

Figure 4:
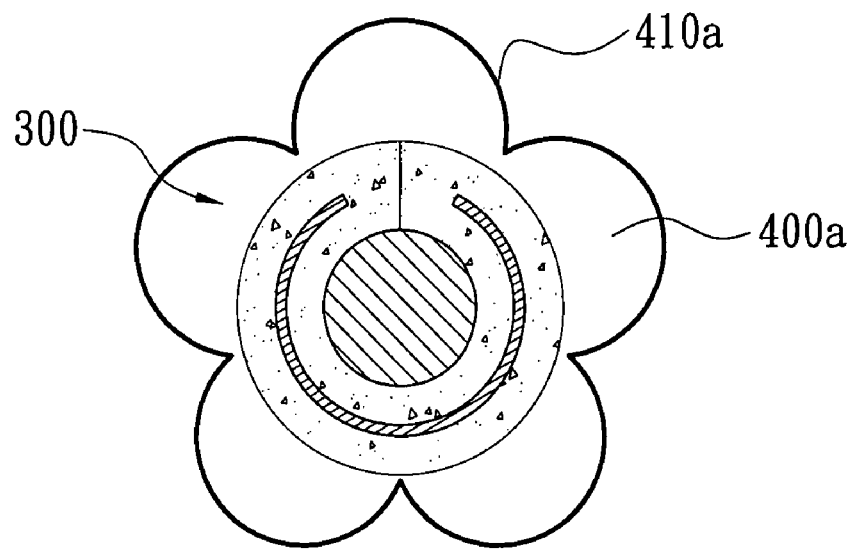
FIG. 4 is a structure sectional view of another embodiment for the method in accordance with the present invention.
Figure 5:
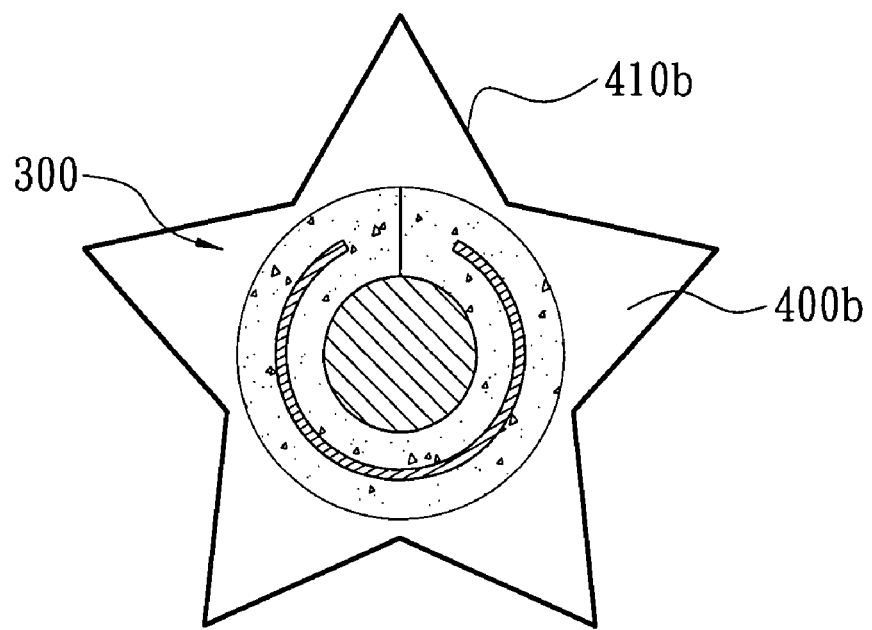
FIG. 5 is a structure sectional view of another embodiment for the method in accordance with the present invention.

In step 160, extruding the composite material 300 into a die 400 through an extruder 270 to reinforce the strength of the die 400 by the core design. In this embodiment, the die 400 is a rectangular die. Because the final appearance of the product depends on the die formation, the practical product appearance is variable by different dies in accordance with customer decoration requirement. Refer to other embodiments for the method in FIG. 4 and FIG. 5, the die 400a has a prunus mume-shaped section, and the die 400b has a star-shaped section.

In step 170, forming a skin 410 on the die 400 to provide decoration and protection effects after the formation of the product is determined. This step includes coating a film through a thermal melt-joint method, spreading a lacquer, or attaching a grained surface for ornamental purposes. In addition, other skin forming methods such as wrapping a metal slice (iron slice or aluminum slice) can be used to enhance strength when the product application field has impact endurance requirement. In this embodiment, the skin 410 is a thermoplastic film with a thickness between 0.5 and 3 mm.

In step 180, cooling the die 400 with the skin 410 to firm the skin 410 to provide the final product of the embodiment.

As embodied and broadly described herein, applying the composite material 300 to the die 400 with determined formation (such as building material, decoration material, furniture material etc.) can decrease weight and reduce material cost. In addition, taking the composite material 300 as a core raises the strength and stiffness of the die 400.

Although the present invention has been described in considerable detail with reference to certain preferred embodiments thereof, other embodiments are possible. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a composite material, comprising:
   (A) providing a sheet object;
   (B) submerging the sheet object in a thermosetting resin to form a compound;
   (C) rolling up the compound to a hollow formation;
   (D) stuffing a substance into the hollow compound to form the composite material;
   (E) heating up and solidifying the composite material; and
   (F) extruding the composite material into a die through an extruder to form a product.

2. The method of claim 1, wherein the step (C) is rolling up the compound by a mold with gradually decreased angles.

3. The method of claim 1, wherein the substance is an expanding foam or a non-expanding foam.

4. The method of claim 1, further comprising (G) forming a cover on the die.

5. The method of claim 4, wherein the step (G) is coating a film.

6. The method of claim 5, wherein the film is a thermoplastic film with a thickness between 0.5 and 3 mm.

7. The method of claim 4, wherein the step (G) is spreading a lacquer.

8. The method of claim 4, wherein the step (G) is attaching a grained surface.

9. The method of claim 4, wherein the step (G) is wrapping a metal slice.

10. The method of claim 9, wherein the metal slice is an iron slice or an aluminum slice.

11. The method of claim 4, further comprising (H) cooling the die with the cover.

12. The method of claim 1, wherein the sheet object is cardboard, non-woven fabric, polyester fiber, polyamide fiber, fiber glass, carbon fiber or plastic film.

13. The method of claim 1, wherein the thermosetting resin is unsaturated polyester, phenol resin, epoxy resin or silicon resin.

14. The method of claim 1, wherein the proportion between the sheet object and the thermosetting resin is approximately 1:9.

15. The method of claim 1, wherein the heating temperature in step (F) is approximately between 60° C. and 150° C.

16. The method of claim 1, wherein the die has a rectangular section.

17. The method of claim 1, wherein the die has a prunus mume-shaped section.

18. The method of claim 1, wherein the die has a star-shaped section.

* * * * *